(12) United States Patent
Michaut

(10) Patent No.: US 8,910,850 B2
(45) Date of Patent: Dec. 16, 2014

(54) METHOD AND DEVICE FOR CONTROLLING A THERMAL CYCLE OF A WELD JOINING ENDS OF STRIP TOGETHER

(75) Inventor: Marc Michaut, L'Horme (FR)

(73) Assignee: Siemens VAI Metals Technologies SAS, Saint-Chamond (FR)

( * ) Notice: Subject to any disclaimer, the term of this patent is extended or adjusted under 35 U.S.C. 154(b) by 0 days.

(21) Appl. No.: 13/698,506

(22) PCT Filed: Aug. 3, 2010

(86) PCT No.: PCT/EP2010/061319
§ 371 (c)(1),
(2), (4) Date: Nov. 16, 2012

(87) PCT Pub. No.: WO2011/144262
PCT Pub. Date: Nov. 24, 2011

(65) Prior Publication Data
US 2013/0056524 A1    Mar. 7, 2013

(30) Foreign Application Priority Data

May 19, 2010   (EP) .................................... 10290265

(51) Int. Cl.
| | |
|---|---|
| B23K 31/12 | (2006.01) |
| B23K 35/24 | (2006.01) |
| B23K 1/00 | (2006.01) |
| B21C 47/24 | (2006.01) |
| B23K 11/25 | (2006.01) |
| B23K 11/00 | (2006.01) |
| G05B 1/00 | (2006.01) |
| B21C 51/00 | (2006.01) |
| B23K 9/025 | (2006.01) |
| B23K 26/26 | (2014.01) |
| B23K 31/02 | (2006.01) |

(52) U.S. Cl.
CPC ............. *B23K 31/12* (2013.01); *B23K 2201/16* (2013.01); *B23K 1/00* (2013.01); *B21C 47/247* (2013.01); *B23K 11/252* (2013.01); *B23K 11/0073* (2013.01); *G05B 1/00* (2013.01); *B21C 51/00* (2013.01); *B23K 9/025* (2013.01); *B23K 26/26* (2013.01); *B23K 31/02* (2013.01); *B23K 11/25* (2013.01)
USPC ........... 228/103; 228/102; 228/227; 228/228; 228/230

(58) Field of Classification Search
CPC ........ B23K 1/00; B23K 11/25; B23K 11/252; G05B 1/00
USPC .......................... 228/227, 228, 230, 102, 103
See application file for complete search history.

(56) References Cited

U.S. PATENT DOCUMENTS

| | | | |
|---|---|---|---|
| 4,596,917 A | 6/1986 | Nied et al. | |
| 5,343,011 A | 8/1994 | Fujii et al. | |

(Continued)

FOREIGN PATENT DOCUMENTS

| | | | |
|---|---|---|---|
| JP | 3207584 A | 9/1991 | |
| JP | 5115903 A | 5/1993 | |

(Continued)

*Primary Examiner* — Erin Saad
(74) *Attorney, Agent, or Firm* — Laurence A. Greenberg; Werner H. Stemer

(57) ABSTRACT

A method and a device for controlling a thermal cycle of a weld joining one end of a first strip to an end of a second strip, suited to a joining machine of a strip treatment plant. The control device includes connections intended to connect the control device to a central automation system of the strip treatment plant and to the joining machine respectively, so as respectively to allow an exchange of at least one strip data item and an exchange of at least one operating data item. A computer is capable of computing, from the strip and operating data items, at least one thermal parameter of the weld. A weld control and characterization device is capable of controlling the welding as a function of the thermal parameter.

12 Claims, 3 Drawing Sheets

(56) References Cited

U.S. PATENT DOCUMENTS 6,506,997 B2 1/2003 Matsuyama
2002/0053555 A1* 5/2002 Matsuyama .................. 219/110

FOREIGN PATENT DOCUMENTS

JP 6106362 A 4/1994
WO 02/24392 A1 3/2002

* cited by examiner

METHOD AND DEVICE FOR CONTROLLING A THERMAL CYCLE OF A WELD JOINING ENDS OF STRIP TOGETHER

BACKGROUND OF THE INVENTION

Field of the Invention

The present invention relates to a method and device for controlling a thermal cycle of a weld joining ends of steel strip traveling in a rolling or processing installation, the ends of the steel strips being welded in a joining machine of a strip treatment plant.

The present invention relates notably to welds for joining steel strips running continuously in a cold rolling installation or an installation for treatment such as surface pickling, continuous annealing, electroplating or dip coating, and in particular to welds of one end of strip to another end of another strip, performed gradually by movement of a welding device along a welding line. In the rest of this document, the expression "treatment plant" will be used to refer to rolling plants or to the abovementioned treatment plants.

In order to improve the productivity of steel strip treatment plants, by avoiding in particular the transformation of said strips reel by reel, modern high-capacity treatment plants are capable of operating continuously by successive joining of the strips to one another, one end of a first strip, for example the tail of a strip at the end of treatment, being connected to another end of a second strip, for example the head of a new strip supplied in the form of a roll which can be inserted at the input of the treatment plant.

During this joining operation, the movement into the treatment plant of the two ends of strip to be welded, i.e. the tail of the first strip and the head of the second strip, is stopped, and the sections downstream of the treatment plant (i.e. the sections situated after said tail of the first strip according to the direction of travel of the strip) are fed by a strip accumulation device previously filled during the period of time separating two successive joins. Such a joining operation is well known to a person skilled in the art whose efforts relate to the speed of the joining operation, so as to limit the stoppage time for the ends of the strip and, consequently, the capacity and cost of the accumulation devices.

Ordinarily, the joining operation is undertaken by a welding joining machine, also called a welder, which comprises, in addition to a welding device itself, two pairs of clamping jaws intended to immobilize the ends of the strip during their joining by welding, respectively a first pair of clamping jaws intended to immobilize the tail of the first strip likely to be engaged in a section of the treatment plant situated downstream of said first pair of jaws in the direction of travel of the strip, and a second pair of clamping jaws intended to immobilize the head of the second strip likely to have been introduced upstream of the joining machine. Different welding methods likely to be used by different welding devices are known to the person skilled in the art. These involve for example flash butt welding, resistance seam welding, MIG, TIG, laser or laser hybrid welding.

The welding joining machine must be capable of producing a high-quality weld. In fact, the rupture of a poor-quality weld during the movement of the strip in the treatment plant, or even the need to re-make a weld deemed incorrect or of poor quality may give rise to serious production losses and relatively high costs.

The metallurgical quality of the weld, in particular for steels susceptible to metallurgical alterations of the zone thermally affected by the welding operation, depends on the method used for welding and the thermal cycle that it induces in said zone affected, as well as the various pre- and post-heating or annealing treatments applied locally in the welding machine itself or immediately downstream of the welding machine. Furthermore, the continuity and compactness of a weld, which also define the quality of said weld, depend essential on the welding parameters used. The value of these welding parameters is selected so as to guarantee a complete join by fusion of the two ends of the strips to be welded, without any excessive thickness or insufficient thickness. The continuity and compactness of the weld also depend on the absence of defects, for example cracks, associated with metallurgical transformations.

The considerable broadening of the ranges of steel grades and thicknesses treated in treatment plants, in particular to meet the demands of automotive manufacturers, has increasingly led to the welding of steel grades with high characteristics susceptible to metallurgical transformations leading to significant hardening and, correlatively, leading to fragility of the weld likely to cause a rupture in the welded joint during movement through the treatment plant.

In order to avoid this weakening of the weld, methods for heat treatment of the weld have been developed by persons skilled in the art and are implemented by heat treatment devices capable of heating the ends of the strip or said weld, in particular by electromagnetic induction. This involves, in particular, the method of annealing after welding, the purpose of which is metallurgically to restore acceptable ductility, or even the method of pre-heating the ends of strips to be welded with a view to reducing the cooling rate of the weld and thus limiting its hardening.

Heat treatment of the weld is controlled manually by an operator based on welding parameter tables. Generally, these tables are drawn up empirically, according to the general material characteristics of the large families of steels, without taking into account the precise chemical or physical differences which may exist within each family of steels. This manual heat treatment control by an operator comprises numerous disadvantages. Notably, there is a non-zero probability of error in selecting a welding parameter from said table. In fact, the imprecise sampling of various steels by said tables requires the operator to select welding parameters which do not correspond exactly to the steel of the strip to be welded, but to a steel with chemical or physical characteristics similar to those of the steel of the strip. This selection is not always suitable and can result in poor quality welds. On the other hand, these tables do not make it possible to determine in a safe and accurate manner a heat treatment suitable for the welding method and the physical and/or chemical characteristics of the strip, in particular in the field of preheating the welds performed by welding methods carried out gradually, such as MIG, TIG, laser, laser hybrid or "mash-lap" welding.

Thus, an incorrect welding parameter is likely to be selected as soon as the material characteristics (physical and/or chemical) of the strip no longer correspond exactly to the general material characteristics of a family of steels in said tables, the selection of said welding parameter therefore potentially leading to a poor quality weld. The difficulty in determining the optimal value of the welding parameters, in particular relating to the preheating conditions of the welds, prompts users of joining machines comprising a heat treatment device to not use a method of heat treatment by preheating, in favor of post-weld annealing. Although preheating would make it possible to manage the metallurgical structure of the weld, post-weld annealing unfortunately presents the disadvantage of allowing spontaneous ruptures, even localized, to develop between the weld and the annealing.

Another significant disadvantage of a system of post-weld annealing is the implementation of very high treatment temperatures (for example 800° C. instead of 100 to 300° C. for preheating) which requires specific design provisions for the weld joining machines, in particular in terms of their clamping jaws, or which require that annealing be performed after the complete weld operation and the movement of this weld away from the grip of said clamping jaws. This annealing after complete performance of the weld and this movement extend the weld cycle time and furthermore necessitate an increase in the strip accumulation capacities of the accumulation devices for the treatment plant, therefore resulting in additional costs.

BRIEF SUMMARY OF THE INVENTION

One object of the present invention is to propose a method and device for controlling a thermal cycle of a weld joining strips which are capable, on the other hand, of defining at least one welding parameter, in particular a thermal cooling parameter of said weld, in accordance with the material and geometric characteristics of the strips to be welded, while taking into account the functional characteristics of a weld joining machine to which they are suited, and on the other hand, of guaranteeing performance in real time of the welding of said strips to be welded according to said welding parameter.

For this purpose, a method and device for controlling a thermal cycle of a joining weld are proposed by the content of the claims. A set of subclaims also presents advantages of the invention.

The object of the present invention is therefore a method for the automatic control of a thermal cycle of weld joining strips, intended to control the welding of one end of a first strip with another end of a second strip by a joining machine of a treatment plant, characterized by:
  a first exchange of at least one strip data item between a device for controlling said thermal cycle and a central automation system of said treatment plant, said strip data item being relative to at least one characteristic of the first strip and/or to at least one characteristic of the second strip, or to at least one characteristic of said strips if said strips are identical. The strip data items comprise, for example, data relating to at least one thickness of each strip and/or at least one component of their chemical analysis, for example, carbon content or carbon equivalent;
  a second exchange, in particular in real time, of at least one operating data item between said device for controlling said thermal cycle and said joining machine, said operating data item being relative to an operation of said joining machine. The operating data items comprise for example, data relating to a setting of a welding device of the joining machine, for example at least one weld energy value available at the output of a welding energy source of said welding device, and a displacement speed of the welding device;
  a determination, notably by calculation and in particular in real time, from said strip and operating data items, of a thermal parameter of said weld;
  a control, in particular in real time, of said welding dependent on at least said thermal parameter. In particular, said control comprises a regulation, notably in real time, of at least one weld parameter of the weld as a function of said thermal parameter. The weld parameter is an operating data item intended for the management of the welding device of the joining machine, in order to perform said weld.

The present invention also proposes a device for controlling a thermal cycle of a weld joining one end of a first strip with another end of a second strip, appropriate for the implementation of the method for controlling said thermal cycle, suited to a joining machine of a strip treatment plant, said joining machine comprising in particular a welding device capable of welding said ends of strips, two pairs of clamping jaws capable of immobilizing said ends of strips, a heat treatment device capable of thermally treating said ends of strips, characterized in that the controlling device comprises:
  connection means intended to connect said control device to a central automation system of said strip treatment plant and to said joining machine so as respectively to allow an exchange of at least one strip data item and an exchange of at least one operating data item. Said strip data item is in particular related to at least one characteristic of the first strip and/or to at least one characteristic of the second strip, or to at least one characteristic of said strips if said strips are identical, and said operating data item is related to an operation of said joining machine;
  a computer capable of computing or determining, notably in real time, from said strip and operating data items, at least one thermal parameter of said weld. In particular, the computer is capable of performing at least one thermal calculation from the following data: thickness, density, thermal diffusivity and specific heat characterizing said strip, and a welding energy and displacement speed characterizing said welding device;
  weld control and characterization means capable of controlling, notably in real time, said welding as a function of said thermal parameter, and notably capable of regulating the weld parameters of the welding device of the joining machine. To this end, the control and characterization means comprise in particular means for measuring and adjusting a quantity of weld energy available at the output of the welding device, means for measuring and adjusting a movement speed of the welding device, means of adjusting the device for thermally treating the ends of the strips, and possibly, adjustable means of an annealing device after welding. In particular, the control and characterization means are capable of cooperating with a heat treatment device by induction comprising at least one inductor, and capable of moving synchronously or asynchronously with a movement of the welding device, it being possible, in particular, for said heat treatment device to be fixed to a support of said welding device, or to a support separate from said welding device support.

Finally, another object of the present invention is a joining machine intended to join successive ends of strips of a strip treatment plant, said joining machine comprising a device for welding an end of first strip to another end of a second strip, two pairs of symmetrically arranged clamping jaws, respectively, a first pair of clamping jaws comprising a first upper clamping jaw and a first lower clamping jaw capable of squeezing, i.e. capable of tightly clamping between themselves, said end of the first strip, and a second pair of clamping jaws comprising a second upper clamping jaw and a second lower clamping jaw capable of squeezing said other end of the second strip, intended to hold and to position said ends of strip opposite one another for welding said ends of strips to one another, characterized in that it comprises the device for controlling a thermal cycle. Furthermore, said joining machine is suitable in particular for the implementation of a joining method characterized in that it comprises said method for the automatic control of a thermal cycle of a weld joining strips.

In particular, said device for controlling the thermal cycle of the joining machine according to the invention is capable of cooperating with said heat treatment device, for example a preheating device and/or an annealing device of said joining machine, notably by adjusting the operating parameters of said heat treatment device, by controlling its operation and start-up. For example the control device according to the invention is notably capable of controlling the adjustable means of the annealing device after welding, which can according to a first variant, move behind the welding device along a support shared with said welding device or on a separate support, synchronous or asynchronous with the movement of the welding device, or, according to a second variant, be fixed and capable of covering the entire width of the strip to be welded. Such annealing devices can for example be positioned between the clamping jaws, below a lower surface of the strip, or, according to another variant, outside the grip and downstream of said clamping jaws, above and/or below the strip, in order to perform the heat treatment of said weld at a location remote from said clamping jaws.

The present invention allows for the control of the thermal cycle of a weld joining strips by automatically determining, prior to and/or during welding, optimal welding parameters notably intended to regulate said welding energy applied to the weld in order to heat said ends of strips. Consequently, the regulation of the welding energy applied to the ends of strips or to the weld makes it possible to control the metallurgical structure of the weld. The determination of the thermal parameter notably enables optimal preheating conditions to be determined at low temperatures for the ends of the strips to be welded, in preference to post-weld annealing at high temperature, and thus facilitates said control of the metallurgical structure of the weld during its cooling.

In particular, said connection means enable on the one hand said first exchange of at least one strip data item related to at least one characteristic of one of said strips, between the computer of the control device and the central automation system of the treatment plant in order to transmit said strip data item to said computer, and on the other hand, said second exchange of at least one operating data item related to the operation of the joining machine, between the computer and the joining machine, in order to transmit said operating data item to the computer. The strip data items comprise geometric and/or physical and/or chemical data items for each of the two strips which must be welded to each other. The operating data items comprise notably adjusting or welding parameters and/or data items related to the real-time operation of the joining machine, notably of its welding device and of at least one heat treatment device. This involves, for example, and in a non-exhaustive manner, data related to the welding energy available at the output of the welding energy source intended to heat the ends of the strips to be welded together, or related to a maximum welding energy available at the output of said welding energy source, or even data items concerning the movement speed of the welding device along the welding line, or its maximum and/or minimum movement speed, but also data or adjusting parameters relating to at least one heat treatment device of the joining machine, such as its movement speed along the welding line, or a correlation between its movement speed and the movement speed of the welding device, or even data related to a thermal energy that the heat treatment device is capable of producing.

Based on these strip and operating data items, said computer is capable of computing at least said thermal parameter of the weld intended in particular to define the cooling of the strip zones affected by the welding energy by regulating notably an energy supply capable of heating said zones. On the other hand, the control device according to the invention comprises, in particular, a database intended for the classification, from at least one of said strip data items, of each of the strips in at least one family of materials, each family of materials comprising at least one reference material characterized by at least one reference data item intended, in particular, for the identification and classification of said strip in said family of materials. Said reference material can, in particular, be identified by at least one element from its chemical analysis, for example, carbon content or carbon equivalent. Said reference data items comprise, in particular, at least one physical and/or chemical characteristic of the reference material on which welding may depend, for example carbon content or carbon equivalent, and/or a critical cooling parameter, for example a critical cooling speed or a critical cooling time between two temperatures. In particular, at least one reference data item for each reference material comprises a critical metallurgical parameter as a function of a setpoint value or enables the definition of a metallurgical behavior as a function of a metallurgical parameter so as to be able to determine said critical metallurgical parameter as a function of said setpoint value. Said critical metallurgical parameter is notably capable of being compared to said thermal parameter. The setpoint value is a data item which can, in particular, be entered into the database by an operator from an operator console, and which is capable of characterizing the weld. It involves for example a maximum hardness which must not be exceeded for said weld, a desired metallographic structure for the weld, or a critical cooling time. In other words, the reference material is characterized by a reference data item comprising in particular a critical metallurgical parameter, for example a critical cooling time, as a function of a setpoint value, for example a hardness imposed by an operator or capable of defining a metallurgical behavior as a function of a metallurgical parameter, for example a variation in the hardness as a function of a cooling time, making it possible to define a critical metallurgical parameter, for example a critical cooling time, as a function of a setpoint value, for example, as a function of a hardness imposed by an operator.

Said database is suitable notably for listing different families of materials according to at least one material identification criterion, and/or a metallurgical behavior of each of said materials, and in particular as a function of said reference data item of said reference materials. It comprises for example chemical and/or physical characteristics of at least one reference material for each family of materials. Advantageously, the classification of each of said strips into a family of materials is notably possible automatically by a classification module of said computer based on said strip data item. In fact, said classification module is capable of determining an association of a strip to at least one family of materials through the identification of at least one of said strip data items and comparison of said identified strip data item with at least one of said reference data items of the reference materials of each family. Thus, the present invention makes it possible to compare at least one strip data item to at least one reference data item comprising information about a physical and/or chemical characteristic of a reference material in order to classify said strip into a family of materials of said database.

In other words, the computer comprises a classification module capable of classifying each strip into at least one family of materials of said database based on a reading or the identification of at least one strip data item. In particular, from at least one reference data item of a reference material in the database, the classification module of the computer is also capable of extracting said critical metallurgical parameter as a function of said setpoint value if the latter is within said reference data item, or of calculating whether at least one of said reference data items makes it possible to define said metallurgical behavior as a function of said metallurgical parameter. In this case, the classification module is capable of determining, as a function of said metallurgical behavior, said critical metallurgical parameter as a function of said setpoint value.

In particular, if the strip data items allow the classification module to identify a reference material in said database for which at least one reference data item corresponds to a strip data item, i.e. if at least one physical and/or chemical characteristic of the reference material corresponds to at least one physical and/or chemical characteristic of the strip, then said classification module is capable of establishing a match between said strip and said reference material notably by creating a match between said critical metallurgical parameter and said strip. In particular, the classification module is capable of selecting the reference material which said strip best matches, i.e. with the highest number of reference data items equal to the strip data items, or even comprising the highest number of physical and/or chemical characteristics shared with said strip.

In particular, if the classification module does not find any reference material in said database with at least one reference data item identical to at least one strip data item, then the classification module is capable of identifying at least two reference materials for which at least one reference data item comprises at least one physical and/or chemical characteristic similar or close to at least one physical and/or chemical characteristic of the strip. For each reference material identified, said classification module is capable of extracting or calculating said critical metallurgical parameter, then of extrapolating from each of said critical metallurgical parameters of each of said reference materials, and notably by means of at least one predefined extrapolation module, an extrapolated critical metallurgical parameter. In all cases, the classification module is capable of identifying or calculating a critical metallurgical parameter for each strip from at least one of said reference data items, and as a function of said setpoint value.

Advantageously, said database according to the invention can be updated: said computer is in particular capable of updating said database by enabling an entry into said database of at least one new reference data item characterizing a new reference material, or a modification of a reference data item characterizing a reference material already included in said database. The new reference material is in particular a steel strip of which a physical and/or chemical characteristic does not appear in the database. In this case, a new reference data item is in particular a strip data item relating to at least one physical and/or chemical characteristic that differs from the physical and/or chemical characteristics of the reference materials included in said database. Furthermore, the computer is in particular capable of deleting from the database at least one reference data item related to a reference material, for example a reference material not commonly used for strip joining. Advantageously, said computer notably enables an operator to enter reference material characteristics into said database from an operator console. Thus, the entry of at least one new reference data item or the modification of at least one pre-existing reference data item into the database advantageously enable the database to be updated according to the results of the weld controls performed on the treatment plant itself or in the laboratory, and thus the weld can be adapted according to said results of said weld controls.

Moreover, the control method according to the invention is in particular characterized in that it comprises an automatic comparison in real time of said thermal parameter with said critical metallurgical parameter. To this end, the computer comprises in particular an analysis module capable of automatically comparing, notably in real time, the critical metallurgical parameter, which can for example be a critical cooling metallurgical parameter, with said thermal parameter which can be a cooling thermal parameter. The analysis module is notably capable of comparing a critical metallurgical parameter value to a thermal parameter value in order to determine an order relation (greater than, less than, equal) between said values.

Equally, the control method according to the invention is, in particular, characterized in that an overshoot of the value of said critical metallurgical parameter (for example a critical cooling time) by the value of said thermal parameter (for example a cooling time calculated based on the strip and operating data items) is capable of inducing, notably automatically, a modification of the value of at least one welding parameter of the joining machine, in order to enable the value of said thermal parameter to return to a value below said critical metallurgical parameter value. Said overshoot refers for example to a value for said thermal parameter which increases and passes a critical metallurgical parameter value which was previously greater than it, but also to a value for said thermal parameter which reduces and passes (becomes less than) a critical metallurgical parameter value which was previously less than it. Advantageously, said overshoot can be identified by the analysis module during said comparison of values. Furthermore, in the case of said overshoot and in the case of said identification of said overshoot by the analysis module, the computer is in particular capable of automatically computing a new value for at least one welding parameter, said new value being intended to maintain the thermal parameter value below the critical metallurgical parameter value. For example, the thermal parameter which can be calculated in real time is a weld cooling time between two reference temperatures between for example 1000° C. and 300° C., and the critical metallurgical parameter is a critical cooling time between two other reference temperatures between for example 1000° C. and 300° C., and below which at least one metallurgical characteristic of a weld zone reaches said setpoint value. The metallurgical characteristic taken into account may be the metallurgical structure (martensitic, bainitic, pearlitic in the case of a steel). It may also simply be hardness. In the case of a hardness taken into account as a metallurgical characteristic, its setpoint value, or tolerable maximum, may be set at a value greater than 300, HV, preferably between 380 HV and 420 HV.

If the cooling time of the weld exceeds the critical cooling time of the weld, then the identification of said overshoot by the analysis module induces a calculation by the computer of at least one new welding parameter intended to reduce or increase the cooling time in order that the cooling time value remains below the critical cooling time value. The computer can for example calculate a new thermal energy contribution by said heat treatment device of the joining machine, by determining notably a preheating temperature of the weld enabling said thermal parameter to remain below the critical metallurgical parameter without changing other welding parameters. It may also determine a preheating temperature of the weld enabling said thermal parameter to remain below the critical metallurgical parameter, by modifying at least one other welding parameter, such as the energy available at the output of the welding energy source and/or the movement speed of the welding device. In the latter case, modifications to the energy available at the output of the welding energy source and/or movement speed of the welding device may in particular be limited by limit values that can be entered into a calculation program of said computer. These limit values may be, for example, a maximum capacity of the welding energy source or a maximum welding time.

The present invention also proposes a reporting system for said overshoot that is communicated by said control device to said joining machine and/or to an operator console, and intended for example to inform an operator visually and/or audibly. In particular, said computer is capable of transmitting said new value of said welding parameter to said control and characterization means of the control device, these latter being in particular able to report said new value of said welding parameter to said joining machine and/or to said operator console. In particular, said control and characterization means are capable of delivering to an operator, in the form of at least one recommendation, said new value of said welding parameter, by recommending for example a new preheating time and/or a new movement speed, and/or a new welding energy.

Equally, said control and characterization means are in particular able to control said welding based on said new value of said welding parameter. In fact, the control method according to the invention is in particular characterized in that said control, notably in real time, of said welding depends on said critical metallurgical parameter which can be defined according to said setpoint value. Said critical metallurgical parameter notably enables a limit value to be defined for the thermal parameter, and therefore the imposition on the welding operation of at least one welding constraint likely to restrict at least one welding parameter in order to limit the thermal parameter value. In particular, said control and characterization means are capable of providing the joining machine or the central automation system with at least one adjustment setpoint for the joining machine, intended for example for the startup of the heat treatment device (a preheating and/or annealing device) and for its adjustment as a function of said new welding parameter.

Thus, the control device according to the invention is in particular on the one hand capable of determining in advance, i.e. before welding, the welding parameters according to said strip and operating data items in order to adjust at least one heat treatment device and the welding device of the joining machine, but also, on the other hand, it is capable of modifying in real time said welding parameters during welding so that they respect one or more critical metallurgical parameters which can be predefined. To this end, the computer of the control device is notably capable of receiving the welding parameter values throughout the duration of welding, such as for example, a measurement of the energy available at the output of the welding energy source and/or a measurement of the welding device movement speed and/or a measurement of the time and temperature of said weld. Based on the welding parameter values which can be measured in real time, the computer is capable of computing in real time said thermal parameter, of comparing it to the critical metallurgical parameter, and, in the event of the value of the critical metallurgical parameter being exceeded by the thermal parameter value, of communicating said overshoot to said control and characterization means in order to provide an operator and/or the joining machine with a setpoint and/or a recommendation or to calculate at least one new welding parameter intended for the control of the joining machine and enabling the thermal parameter value to return to below the critical metallurgical parameter value.

The present invention also proposes a method for joining the ends of successive strips suited to joining the end of a first strip with another end of a second strip by a joining machine of a strip treatment plant, said joining method comprising notably the following steps: clamping of each end of the strips by clamping jaws of the joining machine; cutting of said ends, for example by shears, in order to prepare said ends in view of their being joined to each other; the positioning of said ends intended to enable their welding by a welding device of the joining machine; the welding of said ends by the welding device, likely to cooperate with pre- and/or post-heating of said ends by means of a heat treatment device, characterized in that it comprises said automatic control of the thermal cycle of a weld, in particular able to cooperate with said welding of said strip ends, notably with the pre- and/or post-heating of said ends. In fact, said welding according to the invention can be controlled in real time by adjustment and characterization means of said control device, in order to control the thermal cycle of the weld and to guarantee a quality weld.

Exemplary embodiments and applications of the present invention are provided using the following figures:

DESCRIPTION OF THE INVENTION

Figure 1:
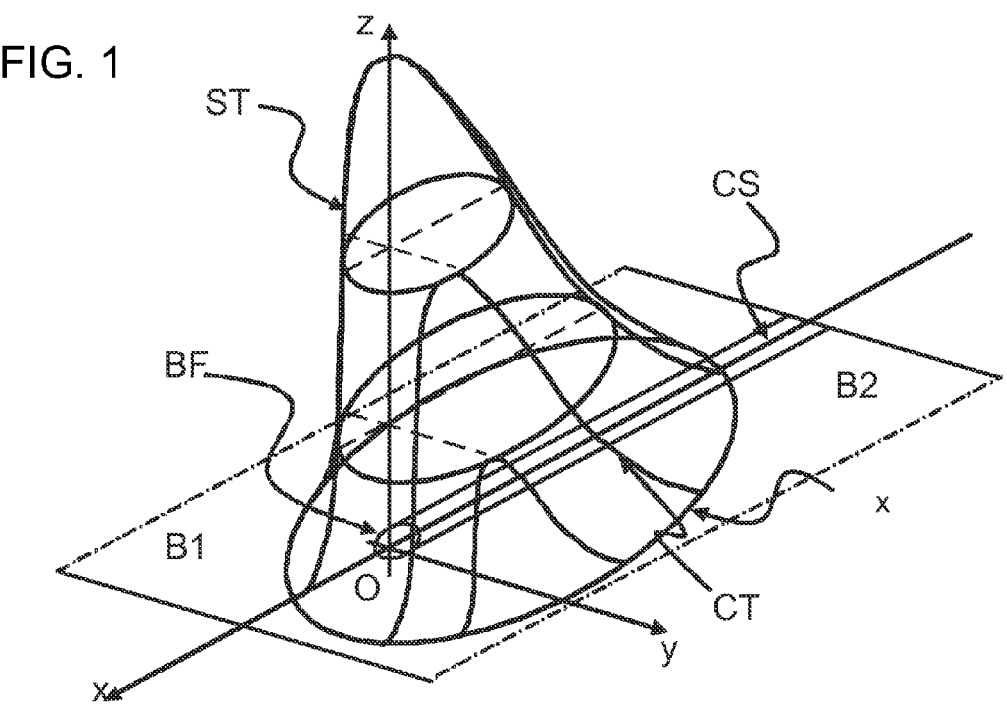
FIG. 1 Example of spatial distribution of heat from a weld when welding two ends of strips.

FIG. 1 presents an example of spatial distribution of heat from a weld when welding two ends of strips. The welding energy source of the welding device is in particular a heat source, for example an electric arc, a laser beam or electrical resistance, capable of heating at least one zone comprising at least one part of each of the ends of strips B1, B2 and of moving along the edges of said ends of strips according to a weld line CS, said edges being opposite one another, in order to enable them to be heated and welded to each other. Under the effect of this heat source, a melting bath BF comprising molten material of each of said strips B1, B2 and possibly a filler metal in the form, for example, of a metal wire, forms and enables said strips to adhere continuously, providing an intimate connection of their edges. The two strips B1, B2 are then capable of forming a continuous strip. The heat from the melting bath is transmitted around the melting bath BF by conduction. Isothermal curves $\theta_x$ develop around the melting bath BF with a typical extended ovoid shape toward the rear of the bath in relation to the movement direction of the welding device (along x). A three-dimensional representation of the overall spatial distribution of the temperatures around the melting bath BF may be constructed by considering an orthonormal reference centered in a center O of the melting bath, comprising an x axis passing through the weld line CS, a y axis perpendicular to said weld line CS and therefore parallel to the direction of travel of the strip, and by assigning the temperatures to a z axis perpendicular to the travel plane formed by the strips and passing through the center O of the melting bath BF. The cutting of this thermal solid ST by a plane parallel to the weld line CS (i.e. parallel to the x axis)

and perpendicular to the direction of travel of the strip makes it possible to obtain a curve of the change in temperature of a point of the strip situated in said parallel plane as a function of the movement of the welding energy source of the welding device. This change in temperature according to the movement of the welding energy source is usually called the thermal cycle CT of the point.

Figure 2:
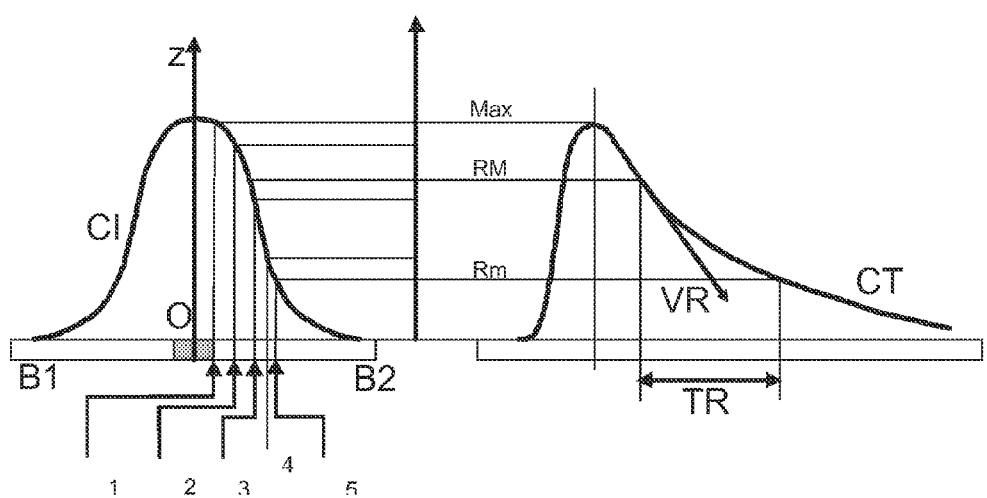
FIG. 2 Example of thermal cycles and of transverse temperature distributions of a weld.

FIG. 2 shows an example of the thermal cycle CT and of the transverse temperature distribution of a weld. The curve CI represents the transverse distribution of temperatures. It involves a cross-section of the thermal solid ST presented in FIG. 1, i.e. according to a plane perpendicular to the surface of the strips B1, B2, and perpendicular to a direction of movement of the welding energy source and passing through the melting bath. The curve CI is symmetrical in relation to the plane perpendicular to the surface of said strips B1, B2 and passing through the weld line of the strips B1, B2. It represents in particular the variation in maximum temperature reached by each point of a line parallel to the y axis, passing through the center of the melting bath and perpendicular to the weld line. This maximum temperature reduces as one moves further away from the melting bath along the y axis and results in, according to the zones, complex metallurgical modifications:

in proximity to the melting bath, between a first temperature $\theta_1$ and a second temperature $\theta_2$ below said first temperature $\theta_1$, for example, respectively between approximately 1500° C. and 1200° C., a very significant increase in the size of the austenite grain generally confers to the metal very high hardenability with development of hard and fragile acicular structures;

between the second temperature $\theta_2$, for example 1200° C., and a third temperature $\theta_3$ below said second temperature $\theta_2$, a set of structures ranging from a normalized structure to coarse structures presenting hardening constituents is generally observed;

between the third temperature $\theta_3$ and a fourth temperature $\theta_4$ below said third temperature $\theta_3$, complex fine structures typical of rapid transformations in the inter-critical domain appear;

between the fourth temperature $\theta_4$ and a fifth temperature $\theta_5$ below the fourth temperature $\theta_4$ and equal for example to approximately 600° C., certain metallurgical phenomena can be observed, such as for example coalescence of certain dispersoids, tempering of quenched tempered structures;

at a temperature below the fifth temperature $\theta_5$, it is usually considered that no notable structural modification occurs.

One point of one end of said strips, or of the weld, for which the thermal cycle CT is likely to reach a maximum temperature $\theta_{Max}$ situated between the first temperature $\theta_1$ and the second temperature $\theta_2$ is a point at which there is a significant risk of embrittlement of the weld. In fact, depending on the time that said point will take to cool down, various metallurgical structures may appear, each relating to a different degree of weld quality. In order to avoid embrittlement of the weld, the present invention proposes to control the metallurgical structure of the weld by controlling notably a thermal parameter, such as for example a cooling speed of the weld. In fact, it is possible to calculate and to control, for a given point, said thermal parameter, for example an instantaneous cooling speed $VR_\theta$ or a cooling time TR between a first reference temperature $\theta_{RM}$ and a second reference temperature $\theta_{Rm}$ below said first reference temperature $\theta_{RM}$, said reference temperatures defining in particular a temperature interval between 1000° C. and 300° C., for example a set of temperatures between 800° C. and 500° C. or between 700° C. and 300° C. In order to calculate this instantaneous cooling speed $VR_\theta$ or this cooling time TR, it is possible to identify on the thermal solid a zone which has been subjected to said maximum temperature $\theta_{Max}$ and to apply a mathematical model to it which is capable of estimating said instantaneous cooling speed $VR_\theta$ or said cooling time TR, such as for example the Rykaline model.

In particular, by knowing the welding energy available at the output of the welding energy source of the welding device, and the movement speed of said welding device (or the welding energy source if the latter moves independently of the welding device which could, for example, be fixed in relation to the strip), it is possible to calculate the cooling time TR of said point of the strip between said first and second reference temperatures $\theta_{RM}$, $\theta_{Rm}$. This calculation of the cooling time TR is for example possible by integrating, between the first reference temperature $\theta_{RM}$ and the second reference temperature $\theta_{Rm}$, a mathematical formula (1) for varying an instantaneous cooling speed $VR_\theta$ between said first and second reference temperatures $\theta_{RM}$, $\theta_{Rm}$. In the case of a first strip identical (i.e. same material, same geometrical characteristics) to a second strip, said mathematical formula (1) is for example:

$$VR_\theta = \frac{2\pi k \rho C_v (\theta - \theta_0)^3 e^2}{E_{eq}^2} \quad (1)$$

where $VR_\theta$=instantaneous cooling speed of said point of the strip during a passage of said point of the strip at any temperature e between the first reference temperature $\theta_{RM}$ and the second reference temperature $\theta_{Rm}$, the instantaneous cooling speed $VR_\theta$ being expressed in kelvins per second and said any temperature e being expressed in kelvins. In other words, the instantaneous cooling speed $VR_\theta$ is the cooling speed at any temperature $\theta$;

$E_q$=welding energy available at the output of the welding energy source per weld length unit, expressed as joules per meter;

$\rho$=density of the material of the strip at any temperature $\theta$, expressed as kilograms per cubic meter;

$C_v$=heat capacity of the material of the strip at any temperature $\theta$, expressed as joules per kilogram per kelvin;

$\theta_0$=initial temperature of said point of the strip, expressed as kelvins. Said initial temperature $\theta_0$ can, for example, be a preheating temperature of said point of the strip, or an ambient temperature;

k=thermal conductivity of the material of the strip, expressed as joules per meter per second per kelvin;

e=thickness of the strip to be welded, expressed in meters.

The calculation of the cooling time TR may also take account of any cooling effect from a heat transfer from said point of the strip to the clamping jaws of the joining machine. The mathematical formula (1) makes it possible, for example, to control the cooling time of a point of the strip between said reference temperatures $\theta_{RM}$, $\theta_{Rm}$, by modifying the energy $E_q$ available at the outlet of the welding energy source and/or the initial temperature $\theta_0$.

FIG. 3 presents four different graphs schematically representing metallurgical behavior. The first three graphs (FIGS. 3a, 3b and 3c) each comprise, on the horizontal axis, a first axis representing an increasing time scale of a cooling time TR, and on the vertical axis, a second axis representing a temperature scale $\theta$ which is also increasing from the origin of said axes. The fourth graph (FIG. 3d) presents a variation in the hardness of a weld of a steel strip as a function of a cooling time TR of said weld. The four different graphs highlight the role of a cooling speed for a zone affected by a steel weld on the metallurgical structure and hardness of said zone.

The first graph (FIG. 3a) shows the change in the metallographic structure of a weld as it cools from a maximum temperature $\theta_{Max}$. The graph comprises three domains delimited in a simplified manner: an austenitic domain A, a martensitic domain M, and a bainitic domain B. A first cooling curve $CR_1$, corresponding to a very short first cooling time $TR_1$, traverses the austenitic domain A, then the martensitic domain M, leading to a final martensitic structure of the weld, which is potentially hard and fragile.

Figure 3A:
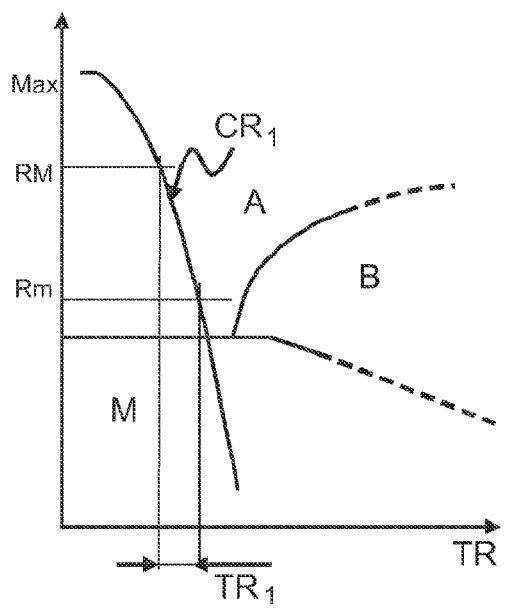
FIG. 3 Example of the influence of a cooling rate on a metallurgical structure and hardness of a zone affected by a steel weld.
Figure 3B:
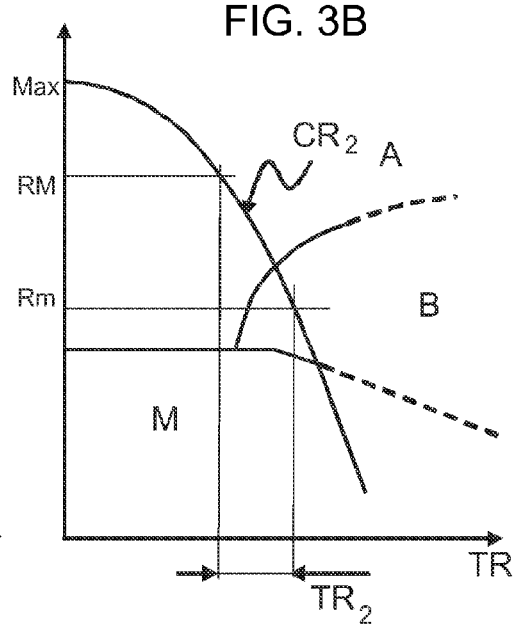
Figure 3C:
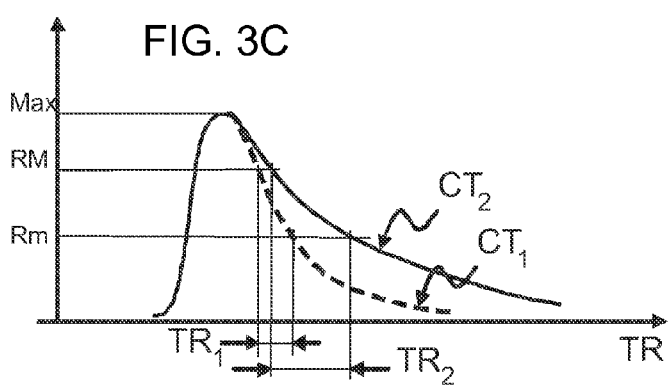
Figure 3D:
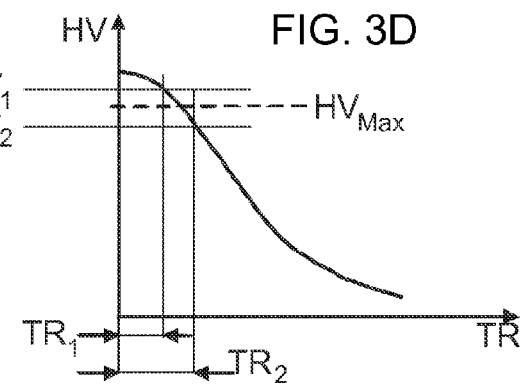

The second graph (FIG. 3b) has the same domains as presented in FIG. 3a, and shows the change in the metallographical structure of a weld as it cools from the same maximum temperature $\theta_{Max}$ and during a second cooling time $TR_2$ which is longer than said first cooling time $TR_1$, according to a second cooling curve $CR_2$ leading to a final bainitic structure.

The third graph (FIG. 3c) shows a first thermal cycle $CT_1$ corresponding to the first cooling curve $CR_1$ and a second thermal cycle $CT_2$ corresponding to the second cooling curve $CR_2$. Through the application of a mathematical model capable of estimating the cooling time TR, for example by incorporating between two temperatures $\theta_{RM}$ and $\theta_{Rm}$ the mathematical formula (1) for estimating the instantaneous cooling speed $VR_\theta$, the computer according to the invention is notably capable of determining which preheating temperature $\theta_0$ and/or which energy $E_q$ available at the output of the welding energy source per weld length unit would be necessary in order to increase the cooling time TR such that it is equal to the second cooling time $TR_2$ corresponding to the second cooling curve $CR_2$. In this case, the metallurgical parameter is the cooling time TR and the critical metallurgical parameter is the cooling time $TR_2$. The cooling time $TR_2$ can be determined from the metallurgical behavior described in FIG. 3b for the metallurgical parameter (cooling time TR) as a function of the reference temperatures $\theta_{RM}$ and $\theta_{Rm}$ and as a function of a bainitic metallurgical structure B selected as the setpoint value.

The fourth graph (FIG. 3d) presents a metallurgical behavior which shows the change in hardness HV of a weld zone cooled from the maximum temperature $\theta_{Max}$ as a function of the cooling time TR. The first cooling curve $CR_1$ leads to a first hardness $HV_1$ greater than a fixed maximum hardness $HV_{Max}$ which can be, for example, a setpoint value, whereas the second cooling curve $CR_2$ leads to a second hardness $HV_2$ which is slightly below the maximum hardness $HV_{Max}$. The control device according to the invention is capable of controlling this cooling time TR by modifying and controlling the parameters on which it depends, such as the energy $E_q$, or the preheating temperature $\theta_0$. In order to modify these parameters, the control device according to the invention is notably capable of controlling and adjusting the joining machine as a function of said parameters. In particular, this fourth graph may be interpreted in the following way in relation to the present invention: the hardness HV is the metallurgical parameter, the maximum hardness $HV_{Max}$ is the critical metallurgical parameter that can be determined on the one hand from reference data capable of characterizing the hardness HV of a reference material as a function of a cooling time TR of said reference material, and on the other hand, from a setpoint value entered by an operator into the database and defining through the maximum hardness value $HV_{Max}$ a hardness limit which cannot be exceeded.

Figure 4:
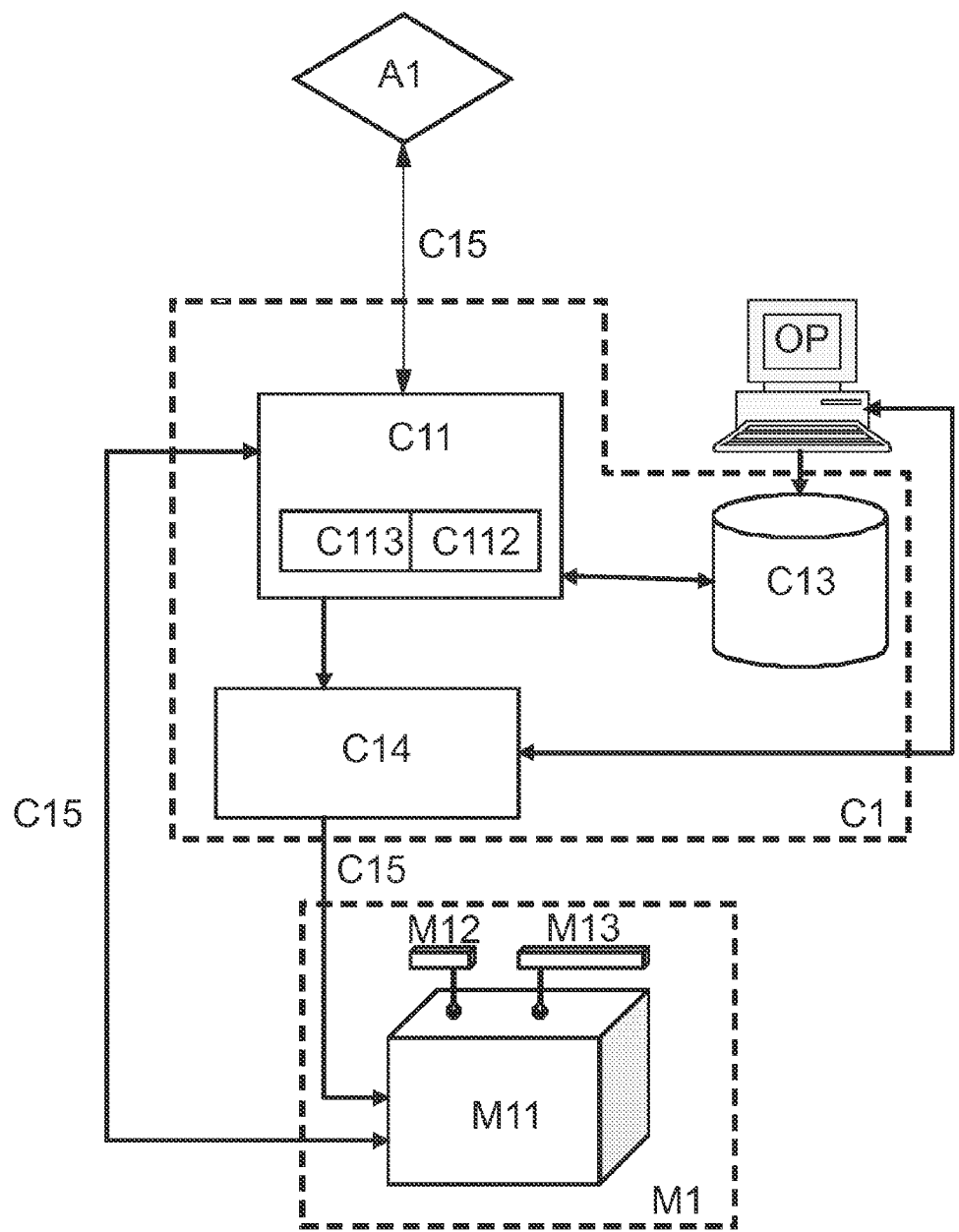
FIG. 4 Exemplary embodiment of a device for controlling a thermal cycle of a joining weld according to the invention.

FIG. 4 presents an exemplary embodiment of a device C1 for controlling a thermal cycle of a joining weld according to the invention, suitable for the implementation of the method for automatically controlling the thermal cycle of a weld joining strips.

The control device C1 is suited to a joining machine M1 of a strip treatment plant (not shown), said joining machine M1 comprising notably a welding device M11 capable of welding one end of a first strip to another end of a second strip, two pairs of clamping jaws capable of immobilizing said ends of strip, at least one heat treatment device M12, M13 capable of thermally treating said ends of strips, for example an induction preheating device M12 and an annealing device M13, said control device C1 being characterized in that it comprises:

connection means C15 intended to connect said control device C1 to a central automation system A1 of said strip treatment plant and to said joining machine M1 so as respectively to allow an exchange of at least one strip data item with said central automation system A1 and an exchange of at least one operating data item of the joining machine with said joining machine M1. The central automation system A1 of the strip treatment plant comprises in particular various information/data concerning the strips being treated, and is capable of exchanging this information/data with said control device C1 using said connection means C15;

a computer C11 capable of computing or determining, from said strip and operating data items, at least one thermal parameter of said weld. This thermal parameter is for example a cooling time of said weld which can be determined from a mathematical formula integrating at least one part of said strip and operating data items into its parameters;

control and characterization means C14 for the welding of said weld capable of controlling said welding as a function of said thermal parameter, and comprising in particular means for measuring and adjusting a quantity of welding energy available per weld length unit, means for measuring and adjusting a movement speed of the welding device, means for adjusting the device for thermally treating the ends of strips, and potentially, adjustable means of an annealing device after welding.

In particular, the computer C11 is capable of receiving data items concerning the strips to be welded from the automation system A1 of the treatment plant. It is also capable of receiving from the welding joining machine M1 at least one operating data item, for example a welding energy value available at the output of the welding energy source of the welding device M11 and a movement speed of the welding device M11 comprising said welding energy source. The computer C11 is in particular capable of performing at least one thermal calculation from at least one thermal model, such as for example the mathematical formula (1) making it possible to obtain said thermal parameter from said strip and operating data items. This thermal parameter is for example a cooling time TR of the weld between a first reference temperature $\theta_{RM}$ greater than a second reference temperature $\theta_{Rm}$ as presented previously in FIGS. 2 and 3.

The control device C1 comprises in particular a database C13 of families of materials intended to classify the strip in at least one family of materials of said database based on said strip data items. This involves steels categorized into families of steels, each family of steels comprising at least one reference steel characterized by one reference data item, making it possible for example to identify said reference steel by means of at least one physical and/or chemical characteristic, for example by an element of its chemical analysis such as its carbon content or carbon equivalent. This database C13 is in particular capable of receiving updates directly from an operator console OP and/or through the central automation system A1 and/or through the computer C11. Each reference material of each family of materials, for example each reference steel of each family of steels, can be associated with at least one critical metallurgical parameter. The critical metallurgical parameter is in particular a critical cooling parameter, for example, a critical cooling time between the first reference temperature $\theta_{RM}$ and the second reference temperature $\theta_{Rm}$ corresponding to a maximum predefined hardness value, as described in FIGS. 2 and 3. Said critical metallurgical parameter is in particular either a reference data item of the reference material in the database, or a data item which can be calculated by a classification module C112 from at least one reference data item of the reference material, if at least one of said reference data items enables a metallurgical behavior to be defined for said reference material as a function of a metallurgical parameter.

The classification module C112 is in particular within the computer C11. Moreover, it is in particular capable of receiving said strip data items intended to identify the material of the strip, and capable of classifying the strip into a family of materials of said database based on said data items. In particular, the classification module C112 is capable of finding in the database C13 at least one family of materials to which said strip is likely to belong, and to identify, within this family of materials, at least one reference material characterized by at least one reference data item, for example a reference steel of a family of steels, said reference data item being at least one physical and/or chemical characteristic comparable or identical to the physical and/or chemical characteristics of the strip, or in other words, comparable or identical to one of said strip data items. The classification module C112 is in particular capable of extracting from the database C13 said critical metallurgical parameter from at least one of said reference data items. This critical metallurgical parameter is for example a cooling time for a point of the strip which characterizes the time required for said point to change from the first reference temperature $\theta_{RM}$ to the second reference temperature $\theta_{Rm}$, this latter being able to correspond for example to a maximum predefined hardness value. Said critical metallurgical parameter can, in particular, be extracted or calculated from at least one of said reference data items of the reference material. Equally, the classification module C112 according to the invention is in particular capable of determining, from at least a first and a second reference data items of respectively a first and second reference material, each with at least one physical and/or chemical characteristic comparable to the physical and/or chemical characteristics of the strip, a median metallurgical behavior likely to correspond to the metallurgical behavior of the weld, and intended to determine said critical metallurgical parameter. Equally, the classification module C112 is in particular capable of extrapolating from at least two critical metallurgical parameters of respectively at least two reference materials each with at least one physical and/or chemical characteristic close to a physical and/or chemical characteristic of the strip to be welded, for example a carbon content or carbon equivalent, an intermediate metallurgical parameter likely to characterize the metallurgical behavior of the strip and to serve as a limit for said thermal parameter.

The computer C11 comprises in particular an analysis module C113 capable of automatically comparing, in real time, the critical metallurgical parameter with said thermal parameter which is determined by a calculation by said computer C11. For example, the thermal parameter is a cooling time TR between the first and second reference temperature $\theta_{RM}$, $\theta_{Rm}$, which is calculated according to the welding energy and the movement speed of the welding device M11 comprising said welding energy source. This cooling time is likely to be compared by said analysis module C113 with a critical metallurgical parameter extracted or extrapolated from reference data items in the database, which can notably be a critical cooling parameter, for example a critical cooling time. Advantageously, if the thermal parameter value exceeds the critical metallurgical parameter value, for example if the cooling time value TR exceeds the critical cooling time value, then the computer C11 is capable of computing in real time at least one welding parameter, intended to manage and/or control the welding, capable of maintaining the thermal parameter value below the critical metallurgical parameter value. Moreover, said computer C11 is in particular capable of communicating said new welding parameter to said control and characterization means C14 of the control device C1 in order that these latter take it into account to control the welding in real time of the ends of the strips to be welded. Said control and characterization means C14 are in particular capable of managing in real time the joining machine according to a thermal cycle defined as a function of said thermal parameter and data measured during welding (weld temperature, energy available, etc.).

According to a first embodiment, said control and characterization means C14 are in particular capable of supplying information to the operator console OP, said information being intended to inform an operator of said value being exceeded such that the former can adjust the welding parameters from the operator console OP, such as for example, preheating by means of the heat treatment device M12 or modification of the welding energy. According to a second embodiment, said control and characterization means C14 are in particular capable of automatically modifying the welding parameters of the welding machine by integrating said new welding parameter therein. In fact, the automatic The control method as claimed in to the invention is characterized in that said control and characterization means C14 are capable of transmitting, either to the central automation system A1, or directly to the joining machine M1, or in particular directly to the welding device M1, an adjustment setpoint comprising a new set of welding parameters comprising said new welding parameter. The new set of welding parameters is intended to adjust the joining machine such that the thermal parameter is capable of returning to a value below the critical metallurgical parameter value.

Finally, the control method according to the invention and the control device for its implementation present therefore numerous improvements in relation to existing practices:
- they facilitate the control of the welding cycle of a joining weld and the determination of optimal weld conditions with a view to controlling the metallurgical structure of the weld through the calculation and control of at least one thermal parameter;
- they facilitate close matching between the thermal cycle of a weld and the metallurgical characteristics (i.e. physical and/or chemical) of the material of the strip;
- they make it possible to favor preheating operations at moderate temperatures instead of post-welding annealing at high temperatures;
- they make it possible to eliminate the risks of incorrect estimations on the part of the operators;
- they enable the database of reference materials to be continually updated without complicating the operator's task;

they enable the adaptation in real time of the welding parameters, and thus the real-time control of the thermal

The invention claimed is:

1. A method carried out by a control device for the automatic control of a thermal cycle of a weld joining strips, for controlling the welding of one end of a first strip to another end of a second strip by a joining machine of a treatment plant, the method which comprises:

carrying out a first exchange of at least one strip data item between the control device of the thermal cycle and a central automation system of the treatment plant, and a second exchange of at least one operating data item between the control device of the thermal cycle and the joining machine, wherein a connection of the control device connects the control device respectively to the central automation system of the strip treatment plant and to the joining machine, and enables the first exchange and the second exchange;

using a computer of the control device for automatically classifying each of the strips into at least one family of materials and determining from the strip data item and the operating data item a thermal parameter of said weld, wherein the computer is configured for computing, from the at least one strip data item and the at least one operating data item, the at least one thermal parameter of the weld, said computer comprising a classification module capable, from said strip data item, of automatically classifying each strip into the at least one family of materials of a database, wherein each family of materials includes at least one reference material that is characterized by at least one reference data item, wherein the reference data items include at least one critical metallurgical parameter; and welding the ends of the first and second strip to one another under control of the welding process in dependence at least on the thermal parameter and the at least one critical metallurgical parameter, wherein control and characterization means of the control device are used for controlling the welding as a function of the thermal parameter and the critical metallurgical parameter.

2. The control method according to claim 1, which comprises automatically comparing in real time the thermal parameter with a critical metallurgical parameter.

3. The control method according to claim 2, wherein the control of the welding process depends on the critical metallurgical parameter that is defined from a setpoint value.

4. The control method according to claim 2, which comprises enabling an overshoot of the value of the critical metallurgical parameter by the value of the thermal parameter to induce a modification of a value of at least one welding parameter.

5. The control method according to claim 4, which comprises reporting the overshoot when the value of the thermal parameter overshoots the value of the critical metallurgical parameter.

6. A method of claim 1, wherein the welding step includes joining ends of successive strips with one end of a first strip joined to an end of a second strip by the welding process with a joining machine of a strip treatment plant; and wherein the thermal cycle of the welding process is controlled by carrying out the method.

7. The method according to claim 1, wherein said classification module configured for classifying each strip into at least one family of materials of said database and of extracting or calculating at least one critical metallurgical parameter from at least one reference data item of at least one reference material.

8. The method according to claim 7, wherein said classification module is configured for comparing the critical metallurgical parameter with the thermal parameter.

9. The method according to claim 7, wherein said computer is configured for automatically computing, in the event that the critical metallurgical parameter value is exceeded by the thermal parameter value, a new value for at least one welding parameter intended to maintain the thermal parameter value below the critical metallurgical parameter value.

10. The method according to claim 9, wherein said control and characterization means are configured for reporting the new value of said welding parameter.

11. The method according to claim 9, wherein said control and characterization means are configured for managing the welding from said new value of said welding parameter.

12. The method of claim 1, wherein said control device additionally controls a joining machine configured for joining the ends of successive strips from a strip treatment plant.

* * * * *